US012761857B2

(12) United States Patent
Edwards et al.

(10) Patent No.: US 12,761,857 B2
(45) Date of Patent: Oct. 13, 2026

(54) SYSTEM FOR AUTOMATIC PLACEMENT OF CONTENT IN A MULTIUSER AR SYSTEM

(71) Applicant: Adeia Guides Inc., San Jose, CA (US)

(72) Inventors: Warren Keith Edwards, Atlanta, GA (US); Aldis Sipolins, Somerville, MA (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 58 days.

(21) Appl. No.: 18/618,535

(22) Filed: Mar. 27, 2024

(65) Prior Publication Data

US 2025/0306840 A1 Oct. 2, 2025

(51) Int. Cl.

| | |
|---|---|
| ***G06F 3/14*** | (2006.01) |
| ***G06F 3/01*** | (2006.01) |
| ***G06T 11/00*** | (2026.01) |
| ***H04L 65/1069*** | (2022.01) |
| ***H04L 65/1089*** | (2022.01) |

(52) U.S. Cl.

CPC ............ *G06F 3/1454* (2013.01); *G06F 3/012* (2013.01); *G06T 11/00* (2013.01); *H04L 65/1069* (2013.01); *H04L 65/1089* (2013.01); *G06T 2200/24* (2013.01); *G06T 2210/21* (2013.01)

(58) Field of Classification Search

CPC ........ G06F 3/1454; G06F 3/012; G06T 11/00; H04L 65/1069; H04L 65/1089

See application file for complete search history.

(56) References Cited

U.S. PATENT DOCUMENTS

| | | | | |
|---|---|---|---|---|
| 2014/0002495 | A1 * | 1/2014 | Lamb | G09G 3/003 345/633 |
| 2020/0334882 | A1 * | 10/2020 | Chang | G06V 10/242 |
| 2023/0308610 | A1 | 9/2023 | Henderson et al. | |
| 2024/0108985 | A1 * | 4/2024 | Terre | H04N 21/4524 |
| 2024/0428542 | A1 | 12/2024 | Gupta et al. | |
| 2025/0044919 | A1 | 2/2025 | Edwards et al. | |
| 2025/0068290 | A1 * | 2/2025 | Bhushan | G06T 19/00 |

OTHER PUBLICATIONS

"Creating a Multiuser AR Experience," Apple Developer, https://developer.apple.com/documentation/arkit/arkit_in_ios/creating_a_multiuser_ar_experience.

Ohlenburg, Jan, et al., The MORGAN Framework: Enabling Dnamic Multi-User AR and VR Projects, VRST'04, Nov. 10-12, pp. 166-169 (2004).

* cited by examiner

*Primary Examiner* — Michelle Chin

(74) *Attorney, Agent, or Firm* — HG LAW LLP

(57) ABSTRACT

The present application provides for adjusting placement positions of an AR object that maximizes viewability for AR devices viewing the AR object. The AR application, after initiating an AR session, may receive a request to display the AR object in an AR environment from a number of other AR devices that wish to view the AR object. The position and orientation for each of the AR devices is determined by the AR application, which then determines a respective field-of-view region for each of the AR devices. Based on these respective field-of-view regions, the AR application identifies an intersection region where all of the respective field-of-view regions intersect, and then selects a first placement position for the AR object within this intersection region. The AR object is then placed at a second placement position based on tags and analysis of the physical area.

18 Claims, 12 Drawing Sheets

600

700

1000

SYSTEM FOR AUTOMATIC PLACEMENT OF CONTENT IN A MULTIUSER AR SYSTEM

BACKGROUND

This disclosure is related to systems and methods for placement of content in augmented-reality environments.

SUMMARY

In some embodiments, AR systems provide display of multiuser augmented-reality (AR) content for multiple users (e.g., equipped with AR-capable headsets or mobile devices that run AR applications) to enable display and interact with virtual content through a shared perspective. Such use of shared AR content by AR systems allows multiple AR user equipment to generate virtual content for display and interactions for multiple users as if the content is physically situated in a common space. For example, each AR device of each user generates AR content such that it is perceived by each user of the AR devices at the same location, and from their own unique orientation.

In some approaches, determining where to place a shared AR object in an AR environment is a manual process. In one embodiment, a single user manually chooses a location for an AR object (e.g., by using UI interface to drag/drop the AR object). For example, the user may manually position the AR object on a nearby tabletop or wall. The system then produces an anchor at this location, based on depth mapping and geometric analysis of the scene. That device of that user then shares that anchor point (potentially along with viewpoint geometry and details about the content itself) with other AR devices of other users in the shared session.

There are a number of key problems with this manual mechanism that limit its ease of use and its scalability. First, the content location chosen by the initiator may be deficient from the perspective of the different AR users. For example, an initiator may choose to place an AR object on a tabletop at a location that (unbeknown to the initiator) is difficult to view for some users in the room. An AR object placed on a wall may inadvertently be placed so low that it is occluded for users in the back of the room. Manually determining a "best placement" requires trial and error, and back-and-forth discussion with the members in the room. Second, an initiator may have to manually move the AR object as AR users come and go, or as they move through the room. This means that an initial manual AR object placement that worked for everyone might not work as AR users move around or join the meeting. Moreover, this aforementioned iterative process is a time-intensive process.

To overcome these problems, systems and methods are provided herein for adjusting placement positions of an AR object that maximize viewability for AR devices viewing the AR object. In some embodiments, an AR application accesses an AR object and a tag that defines placement preference for the AR object. For example, the AR object may be a digital art piece that has a placement preference that is close to a wall in an enclosed space. The AR application, after initiating an AR session, receives a request to display the AR object in an AR environment from a number of other AR devices that wish to view the AR object. Continuing with this example, a number of users equipped with AR headsets wish to view this digital art piece in an enclosed room setting. The position and orientation for each of the AR devices is determined by the AR application, which then determines a respective field-of-view region for each of the AR devices. Based on these respective field-of-view regions, the AR application identifies an intersection region where all of the respective field-of-view regions intersect, and then selects a first placement position for the AR object within this intersection region. For example, the AR application determines that all of the AR headset-equipped users are facing in a convex orientation and determines an overlap from all the AR headset fields of view.

In some embodiments, the AR object is then placed at a second placement position based on the tag and analysis of the physical area. Finally, the AR application displays the AR object at this second placement position for viewing by all of the AR devices. For example, the users may be in an enclosed room setting and the convex orientation lends itself to a nearby wall where all the headsets fields of view intersect. There is a tag specifying the AR object should be presented near a wall. The AR application then adjusts the placement of the digital art piece AR object to be near the wall (within the intersection region) for viewing for all of the users with AR-equipped headsets.

In some embodiments, an AR application determines that there is an occlusion of the first placement position of a physical object within a determined respective field-of-view region of an AR device. If so, the AR application adjusts the first placement position outside the detected occlusion. In some embodiments, the first placement position is adjusted to the second placement position based on a revised intersection region that excludes the portion of the intersection region that corresponds to a region affected by the occlusion. For example, there might be a protruding cabinet in the enclosed room that the AR headset equipped users are standing within that impedes them from having a full field of view; a user interface may suggest that the users nudge themselves to an outlined position where the cabinet is no longer impeding. In this way, the system considers limited or restricted fields of view when determining the placement position for AR objects.

In some embodiments, an AR application may access multiple tags and determine a priority of placement preference to adjust the position based on this priority. For example, a first tag may specify to place the AR object near a wall, and a second tag with higher priority may specify to place the AR object against a window. If the intersection region has both a window and a wall present, the placement position for the AR object may be prioritized for a window placement. In some embodiments, when selecting the first placement position for the AR object, the AR application may select a region that is equidistant from each AR device or a placement position having a defined orientation or size for the AR object.

In some embodiments, changes in position or orientation of the AR devices are determined by the AR application, and an update policy may be applied based on these changes. The update policy may have multiple functionalities that may include to update the placement position of the AR object, to refrain from updating placement position of the AR object, or generate a prompt for an action selection. In some embodiments, the prompt may define an exclusionary time period for an AR device that refrains from updating during this period. For example, the user equipped with an AR headset who is going to the bathroom may want to specify, via a user interface prompt, that they wish to define a five-minute time period where the system does not update the intersection region and does not use the position or orientation of this headset for intersection region determinations.

The disclosed system, as described above and within this disclosure, analyzes the geometry of the AR devices and the geometry of the environment itself to determine a placement position of an AR object. This system prevents occlusions impeding visibility and ensures that all AR members have visibility to the shared AR object. The system also provides for specific AR objects to have specific preferences that maximize viewability (e.g., orientation of a digital art piece to be shown, and minimum text size limits for readability). As such, a more natural interaction of shared AR objects among AR devices is provided without laborious and time-intensive manual management of placement positions.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
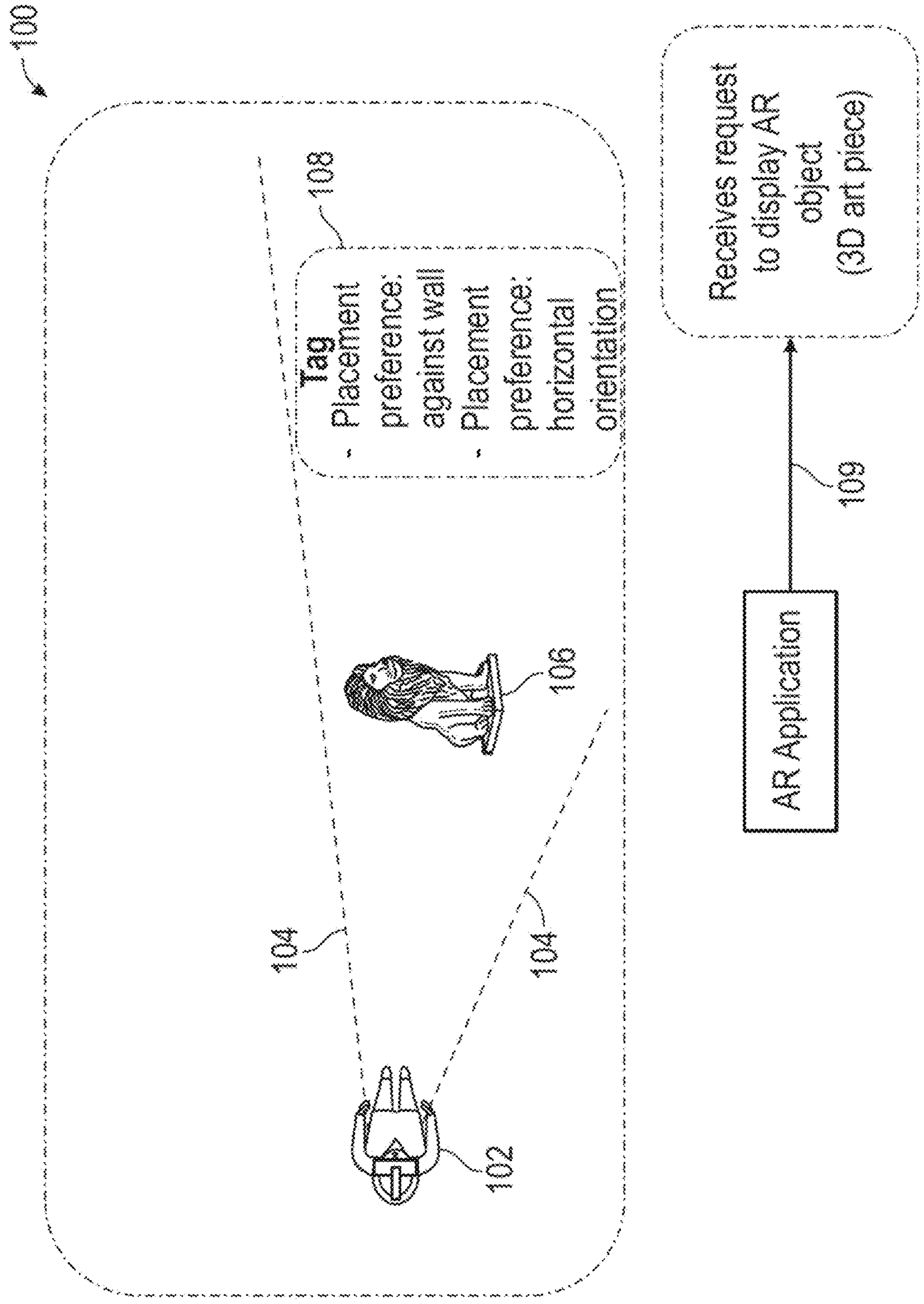
FIG. 1A shows an illustrative scenario in which an object is viewed in augmented reality by an AR device, in accordance with some embodiments of this disclosure.

FIG. 1 shows an illustrative scenario 100 in which an object is viewed in augmented reality by a plurality of AR devices, in accordance with some embodiments of this disclosure. In some embodiments, an AR application is implemented on user equipment that is AR-compatible. An AR application may wish to create a session with a plurality of other AR devices that wish to view a shared AR object. The AR devices within the shared session may communicate with each other, either via peer-to-peer communication mechanisms (Bluetooth, UWB, or peer-to-peer Wi-Fi) or by using a cloud-based service as an intermediary or via some local/edge transfer mechanism.

The AR application may store an AR object and a tag that defines placement preference for the AR object. The AR application may then access the AR object and the tag. An AR device may wish to share an AR object with a plurality of other AR devices. The AR application may receive a request 109 to display the AR object. For example, an AR headset 102 may wish to share an AR representation of a digital art piece 106 with other AR devices. The AR object may have a tag that has a placement preference. For example, a tag 108 associated with the digital art piece specifies that it has a placement preference to be placed close to a wall in an enclosed space, and horizontal orientation is preferred.

In some embodiments, the AR application may determine a respective field-of-view region over the physical area for each AR device of the plurality of AR devices based on the respective determined position and the respective determined orientation of the respective AR device. FIG. 1A shows an illustrative scenario 100 in which an object is viewed in augmented reality by an AR device, in accordance with some embodiments of this disclosure. In FIG. 1A, the AR headset device 102 has a corresponding field of view 104 that emanates from the AR headset device outward. In similar fashion, a plurality of other AR devices 111 and 114 have fields of view 112 and 116, respectively. In some embodiments, the field of view is determined by utilizing the position and orientation of the AR devices themselves. In some embodiments, the position and orientation data may be retrieved from the AR devices themselves. Many AR devices have sensors such as accelerometers that provide accurate orientating and positioning data. In some embodiments, the orientation and position data may be determined from Wi-Fi fingerprinting, GPS localization, ultra-wideband positioning, and/or visual positioning systems (VPS) techniques. In some embodiments, the AR application may continually determine the respective determined position and the respective determined orientation of the respective AR devices. In some embodiments, the AR application may, on an interval basis, determine the respective position and the respective orientation of the respective AR devices. In some embodiments, the AR application may determine a plurality of positions and orientations for an AR device and perform a mathematical operation (e.g., an average, or similar operation) to ignore outlier movements or orientations of a specific AR device. For example, this technique may prevent a rapid head movement (e.g., flinch) of an AR device on a user from being included in the overall position and orientation of the device. In some embodiments, the AR application may determine respective position and orientation of the AR device based on eye gaze tracking by calculating a gaze vector based on the respective determined eye gaze.

Figure 1B:
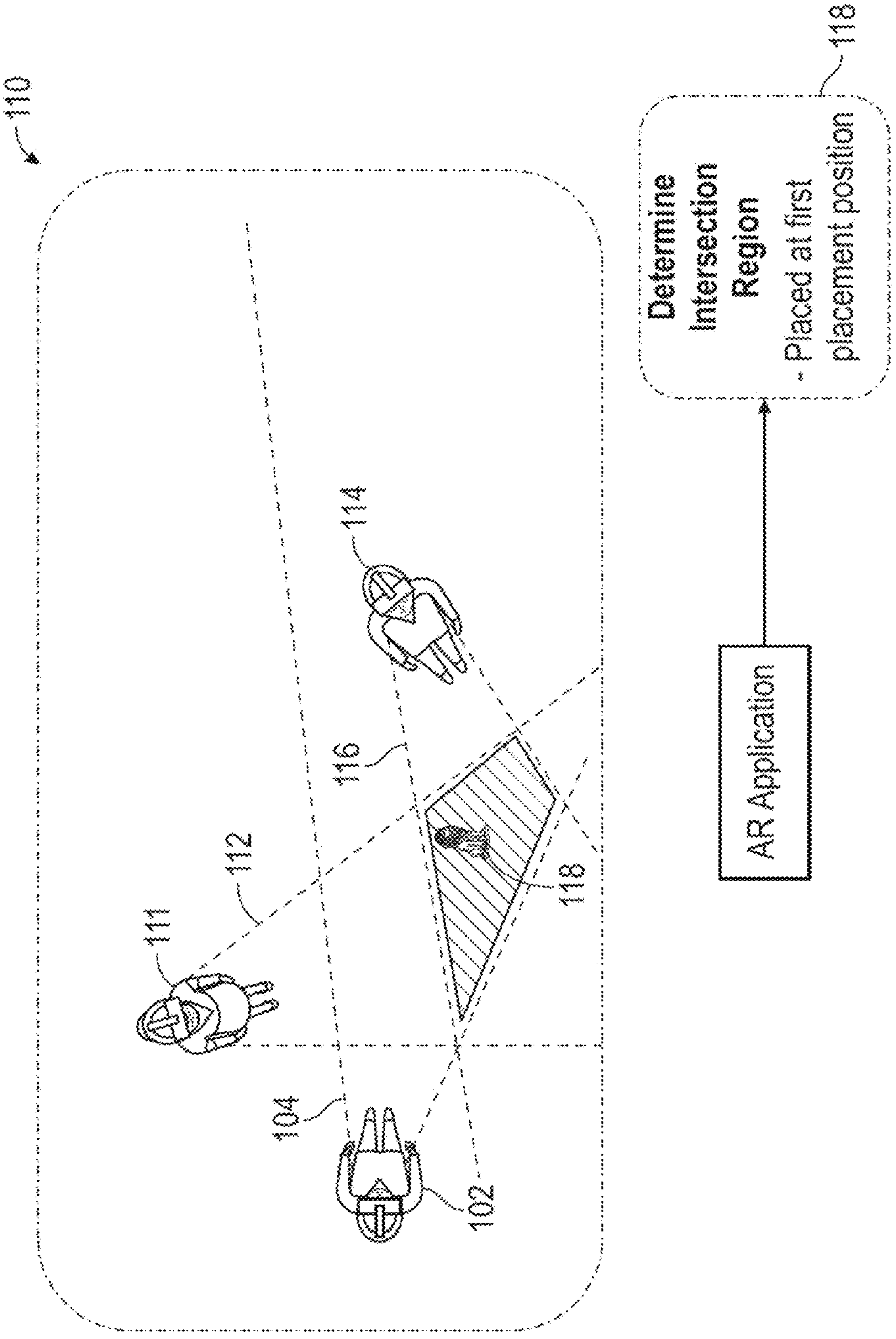
FIG. 1B shows an illustrative scenario in which an object is viewed in augmented reality by a plurality of AR devices, in accordance with some embodiments of this disclosure.

In some embodiments, the AR application may identify an intersection region in the physical area where all of the respective field-of-view regions intersect. In some embodiments, the AR application implements mathematical techniques to calculate the intersection region based on the positional and orientation data of the AR devices. FIG. 1B shows an illustrative scenario 110 in which an object is viewed in augmented reality by a plurality of AR devices, in accordance with some embodiments of this disclosure. In FIG. 1B, the intersection region is represented by the shaded region and shows the intersection of all AR device fields of view 104, 112, and 116. Although this figure illustrates an intersection in 2D space, it should be understood that these techniques are adapted to function in 3D space. The AR application may determine an intersection region with 3D adapted mathematical techniques to determine intersection based on 3D coordinate positional and orientation data.

In some embodiments, the AR application may not be able to identify an intersection region in the physical area where each of the respective field-of-view regions intersect. The AR application may calculate that at least one AR device is preventing an intersection region from being achieved based on mathematical calculations of the respective field-of-view region over the physical area for each AR device of the plurality of AR devices. In response to a determination that at least one AR device is preventing the intersection region from being achieved, the AR application excludes the at least one AR device.

In some embodiments, the AR application selects a first placement position for the AR object in the identified intersection region. In FIG. 1B, the digital art piece is placed within the intersection region at a first placement position 118. In some embodiments, the AR application selects a position within the identified intersecting region that is equidistant from each AR device of the plurality of AR devices. In some embodiments, the AR application selects a position within the identified intersecting region that is proximate to a specific threshold to one of the AR devices (e.g., the AR object is positioned closer to the host who may be presenting). In some embodiments, the AR application may determine multiple placement positions via a clustering algorithm (or similar). In some embodiments, the AR application may select a position within the identified intersecting region that minimizes, for each of the AR devices, the distance from a center coordinate of the field-of-view region of the respective AR device. For example, the center coordinate may be the coordinate where the gaze vector is at (x=0, y=0, z=0) in 3D cartesian coordinates for a particular AR device. In some embodiments, the AR application may select a position within the identified intersecting region that minimizes, for a selected AR device, the distance from a center coordinate of the field-of-view region of the respective AR device.

Figure 1C:
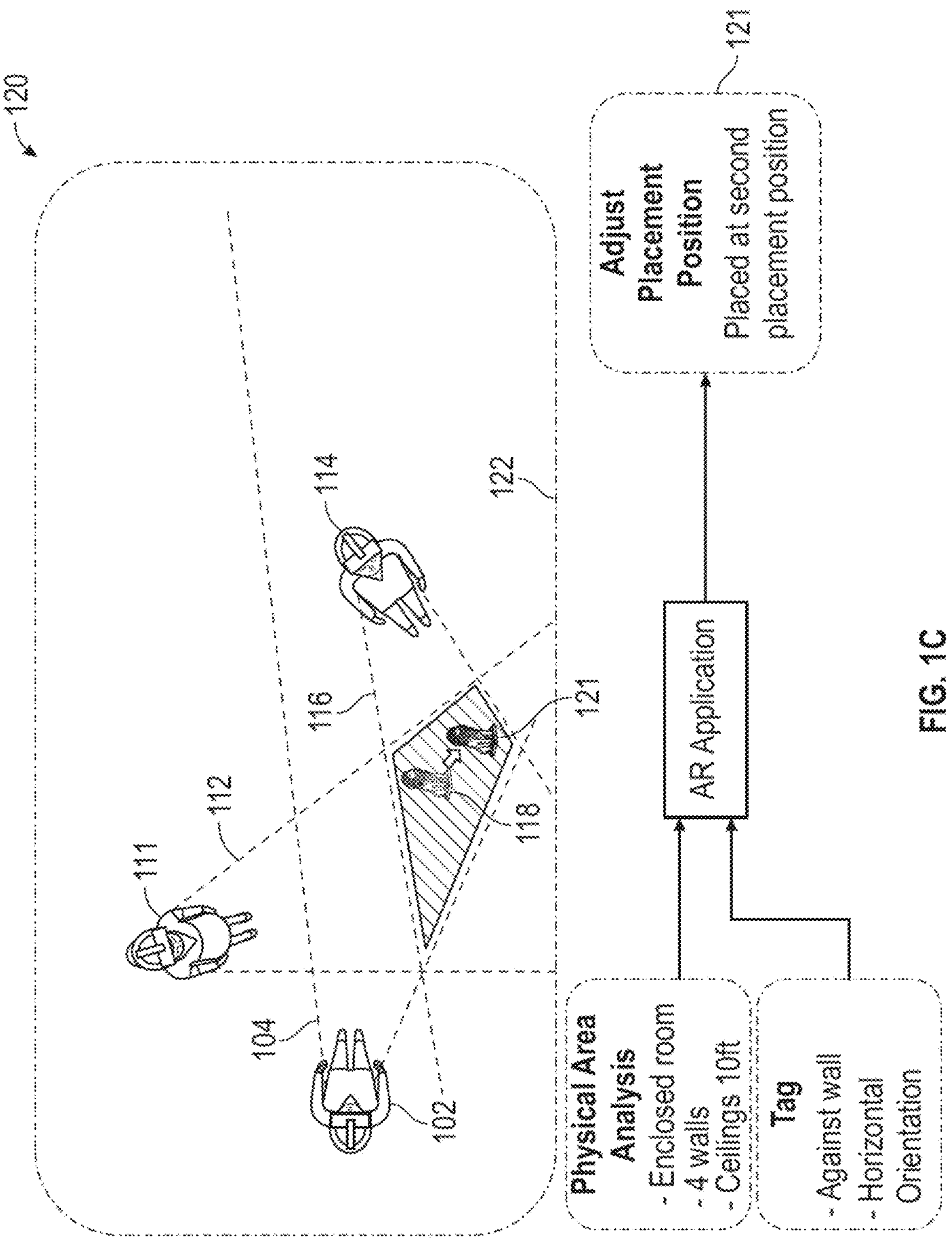
FIG. 1C shows an illustrative scenario in which an AR object is positioned at an adjusted placement position in augmented reality for a plurality of AR devices, in accordance with some embodiments of this disclosure.

In some embodiments, the AR application adjusts the first placement position to a second placement position based on the tag and analysis of the physical area. The AR application may implement computer vision techniques to analyze the physical area to determine physical dimensions, color spectrum, and other visual parameters associated within the physical space proximate to the AR device. The AR application may retrieve information collected from one or more sensors functional to the AR device such as accelerometers, thermometers, and other types of sensors. The AR application may process the AR object tag to determine placement preferences. FIG. 1C shows an illustrative scenario 120 in which an AR object is positioned at an adjusted placement position in augmented reality for a plurality of AR devices, in accordance with some embodiments of this disclosure. In FIG. 1C, the AR application determines that the physical area is an enclosed room with four walls and ceilings of 10 feet based on computer vision techniques. The AR application further determines that the tag of the digital art piece specifies preferences to be horizontal in orientation and proximate to a wall within an enclosed room. Based on these placement preferences, the AR application adjusts the placement of the digital art piece to a second placement position shown at 121. The AR application may cause each AR device of the plurality of AR devices to generate for display the AR object to appear in the second placement position.

Figure 2:
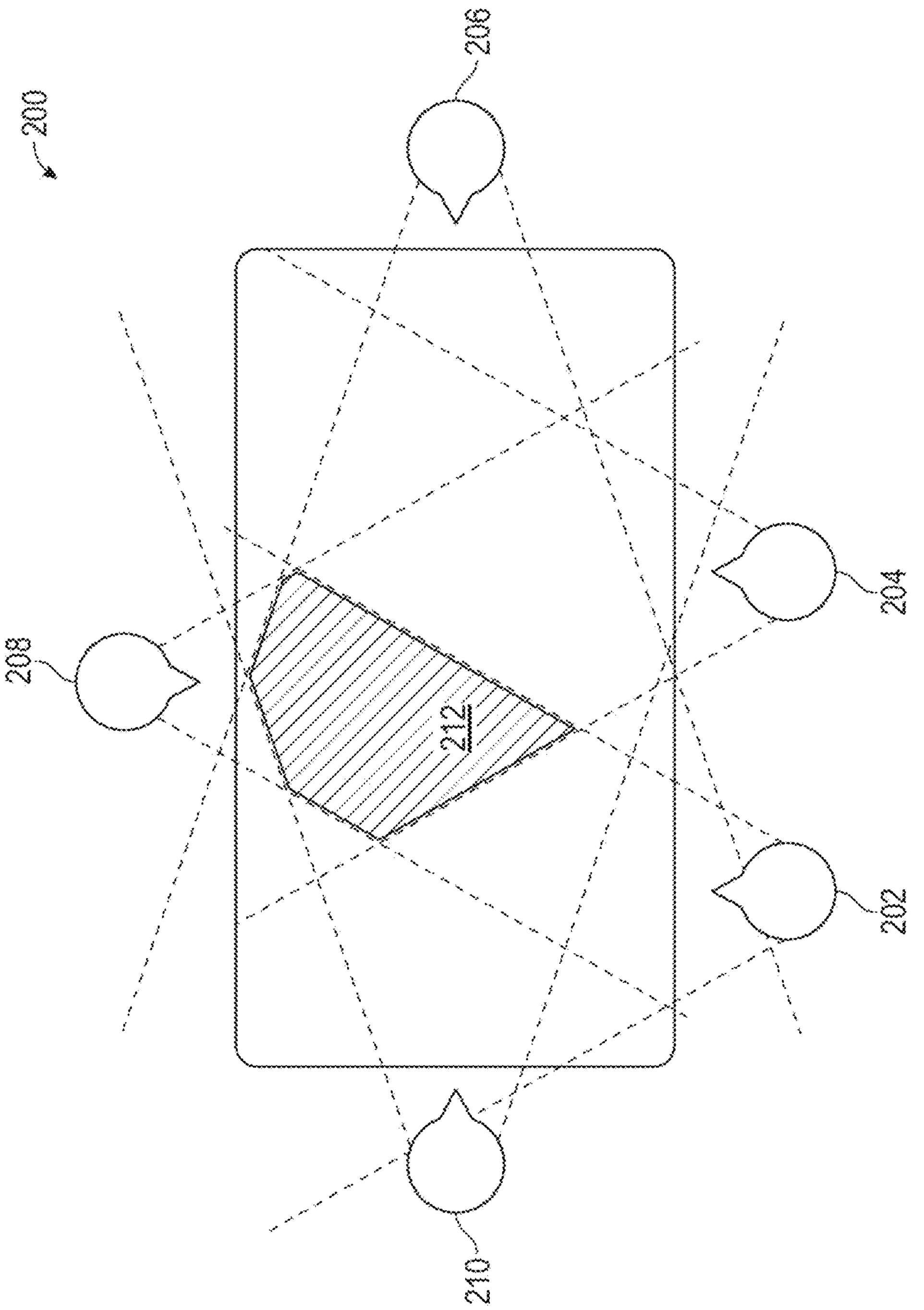
FIG. 2 shows an illustrative scenario in which a plurality of AR devices is positioned in a bounded intersection region for an AR object placement, in accordance with some embodiments of this disclosure.

FIG. 2 shows an illustrative scenario 200 in which a plurality of AR devices are positioned in a bounded intersection region for an AR object placement, in accordance with some embodiments of this disclosure. In this example, the AR devices 202, 204, 206, 208, and 210 are positioned and oriented in a concave arrangement such that there is a convergence of the respective fields of view at 212 (e.g., the intersection region). whereby the plurality of AR devices are facing inward. This is referred to as bounded as there is a determined bounded intersection region based on the concave arrangement.

Figure 3:
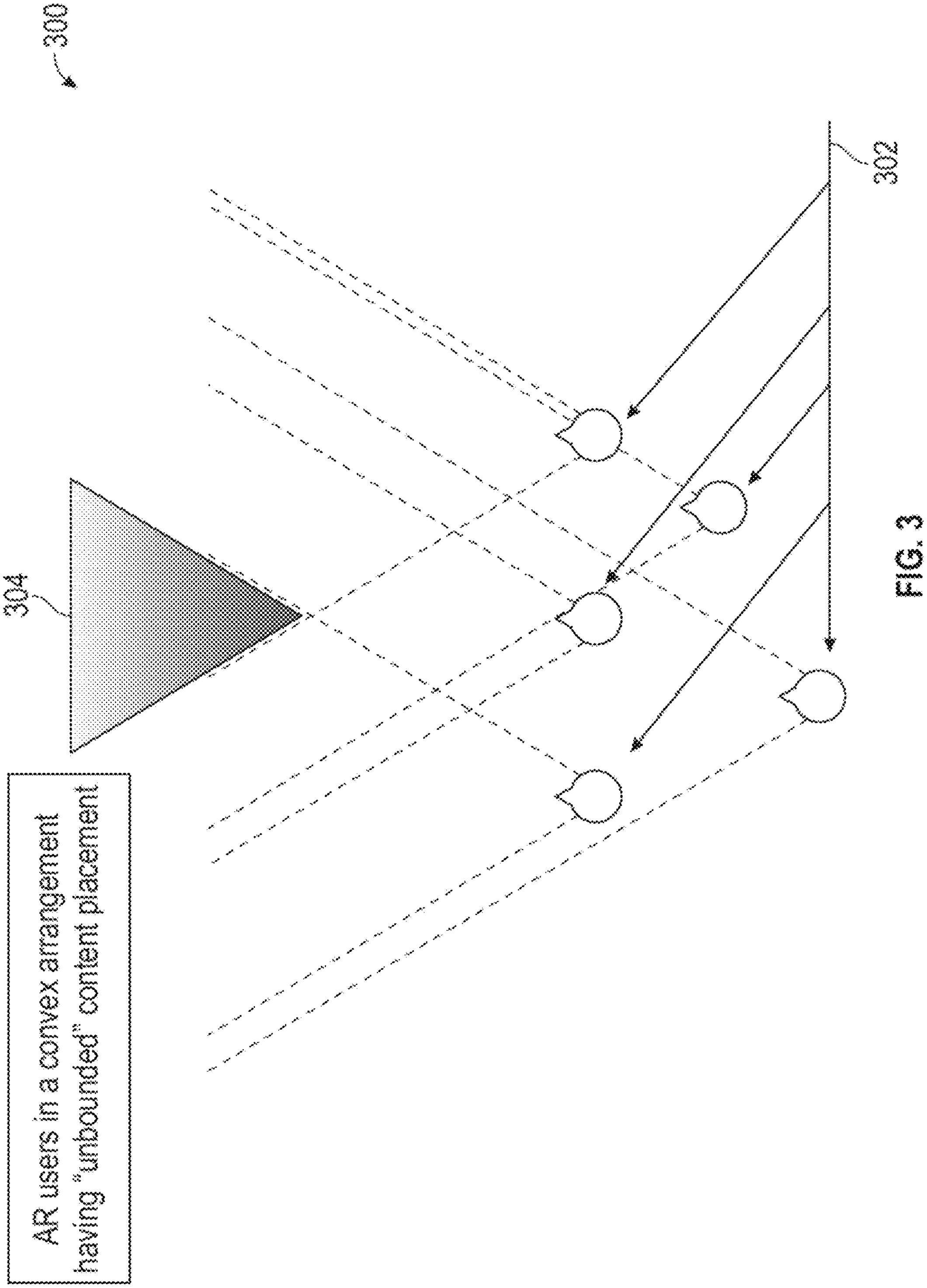
FIG. 3 shows an illustrative scenario in which a plurality of AR devices is positioned in an unbounded intersection region for an AR object placement, in accordance with some embodiments of this disclosure.

FIG. 3 shows an illustrative scenario 300 in which a plurality of AR devices are positioned in an unbounded intersection region for an AR object placement, in accordance with some embodiments of this disclosure. In an unbounded arrangement, the plurality of AR devices are facing outward. In this example, the plurality of AR devices 302 are positioned and oriented in a convex arrangement such that there is not a fully bound convergence of the respective fields of view. However, there is an unbounded convergence of the respective fields of view at 304 (e.g., the intersection region). In some embodiments, the AR application applies a radius from one of the AR devices to create a fully bounded arrangement in this convex orientation.

In some embodiments, as an example, the AR application may determine a respective position, orientation, and gaze vector for each AR device of the plurality of AR devices. In some variants, the AR application transmits each of the respective position, orientation, and gaze vectors to each of the AR devices. The AR application determines a respective field-of-view region over the physical area for each AR device of the plurality of AR devices and then determines a defined region (which may be bounded or unbounded). Based on this, the AR application calculates an intersection region in the physical area based on the field-of-view regions. If there is no intersection region found, the AR application excludes one or more AR devices that are preventing an intersection region from being found. The AR application determines whether the intersection region is within the defined region: if so, the region is bounded, if not, the region is unbounded. The AR application stores metadata associated with the intersection region in relation to the bounding status of the intersection region (e.g., bounded or unbounded). The AR application selects a first placement position for the AR object in the identified intersection region. In some embodiments, the AR application may nudge the first placement position for the AR object to a second placement position for the AR object to optimize equidistance between users. In another embodiment, the AR application may nudge the placement position for the AR object to a second placement position to be within a proximity of a specific user (e.g., this may be specified within a tag).

Figure 4:
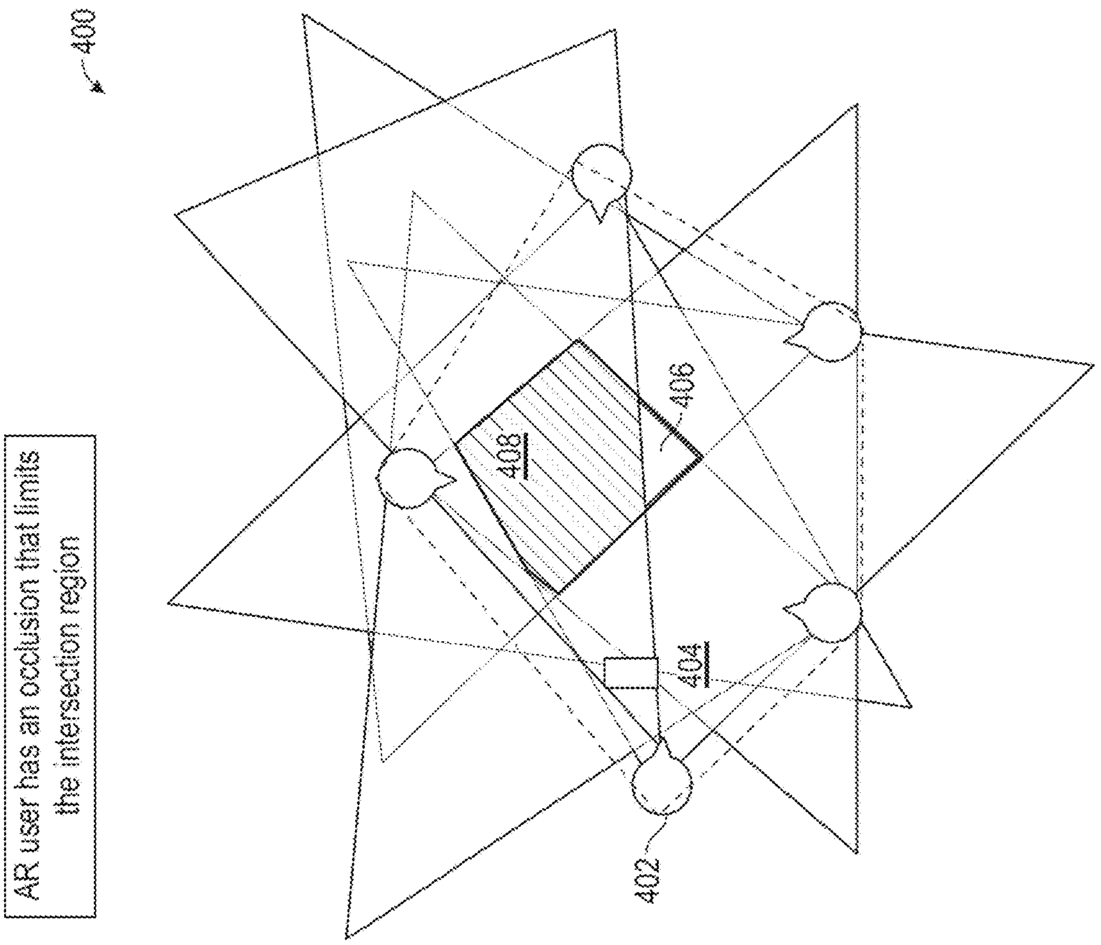
FIG. 4 shows an illustrative scenario in which an AR device is partially occluded by an obstruction to the intersection region, in accordance with some embodiments of this disclosure.

In some embodiments, the AR application analyzes the physical area by detecting an occlusion of the first placement position for the AR object by a physical object within a determined field-of-view region of an AR device of the plurality of AR devices. The AR application may receive sensory information from one or more AR devices that detect the occlusion. This detection of occlusions may occur using a depth camera, LIDAR, or other technology that can determine the distance between the AR device and an arbitrary object. FIG. 4 shows an illustrative scenario 400 in which an AR device 402 is partially occluded by an obstruction 404 to the intersection region 408, in accordance with some embodiments of this disclosure. The AR application may adjust the first placement position for the AR object outside the detected occlusion. In some embodiments, the AR application adjusts the first placement position to the second placement position based on a revised intersection region that excludes a portion of the intersection region that corresponds to a region affected by the occlusion. This is shown in FIG. 4 where the portion of the intersection region that is not occluded is denoted 406. The AR application adjusts the first placement to a second placement position within this region 406. In some embodiments, the AR application may adjust the first placement position to the second placement position that is on a periphery of a region affected by the occlusion. For example, the placement may be on the perimeter of the region affected by the occlusion to mitigate the effect of the occlusion.

In some embodiments, as an example, the AR application may determine the distance of an AR device to the first placement position. The AR application may determine a physical object within the field of view region between the AR user and the first placement position that occludes the field of view region. The AR application may then determine an exclusion region for the AR device based on the physical object within the field of view region that excludes the occlusion. In some embodiments, the AR application transmits this exclusion region to the plurality of AR devices. The AR application then determines a revised intersection region based on the exclusion region such that there are no occlusions in the revised intersection region. The AR application determines whether the placement position for the AR object is outside of the exclusion region. If so, the placement position is maintained; if not, the placement position is nudged, by the AR application, to a revised placement position that is outside the exclusion regions.

In some embodiments, the AR application may store a second tag for the AR object that defines a second placement preference for the AR object. The AR application may access the second tag for the AR object. The AR application may then determine a priority of placement preference between the first placement preference and the second placement preference and adjust the second placement position based on the determined priority of placement preference. In this way, there may be a plurality of tags, and the priority of the placement preferences are determined by the AR application based on one or more criteria. The criteria may be preconfigured by the AR application or implemented via other methodologies of priority by the AR application. For example, a first tag may specify to place the AR object near a wall, and a second tag with higher priority may specify to place the AR object against a window. If the intersection region has both a window and a wall present, the placement position for the AR object may be prioritized for a window placement. In some embodiments, the placement preference can include defined orientations, defined size of AR object (e.g., minimum and maximum sizes), defined properties for content (e.g., text size thresholds, contracted text revisions based on text size), defined parameters for lighting (e.g., a lumens threshold for minimum and maximum, lack of glare, etc.), visual angle of AR object, optimal distance from AR object (e.g., minimum and maximum distance), and/or other positional or orientation-based preferences. Certain types of AR objects may be best viewed anchored to vertical or to horizontal surfaces (e.g., a virtual poster might most naturally be anchored to a physical wall or whiteboard, while an architectural model might be most naturally anchored to a table or desk). AR objects may also have preferred sizes or other constraints that may guide where that content should be placed and how it should be scaled in order to ensure maximum legibility. AR objects may also have certain natural sizes—an object with only coarse texture maps or polygon counts may be boxy when rendered too large, while small text on an object may be illegible when rendered too small.

In some embodiments, the AR object may include a tag in a format similar to below:

ORIENTATION={VERTICAL|HORIZONTAL|WRAP|ANY}

This tag would govern the sort of placement preferences that should be considered as viable for the AR object: VERTICAL may indicate a natural affinity for a vertical surface such as a wall or whiteboard; HORIZONTAL may indicate desired placement on a table or desk; WRAP may indicate that the content object is a texture to be applied (wrapped) to any object in the environment; or ANY may indicate that there is no specially desirable orientation for the AR object. In some embodiments, the AR application implements a dynamic orientation tag in which each AR device has the AR object generated for display from their own unique perspective. For example, a UI for a streaming platform may be dynamic such that each AR device views the UI from their own unique perspective, and none of the AR device would view the back of the UI if they were situated on the opposite side of another AR device that would view the front of the UI.

In some embodiments, as an example, the AR application determines a subset of placement positions for the AR object in the identified intersection region that can accommodate the AR object at its natural size (e.g., as specified in tag). If the subset of placement positions exists, the AR application selects one of the subsets and places the AR object at this selected placement position. If not, the AR application determines a subset of placement positions for the AR object in the identified intersection region that can accommodate the AR object at its minimum size (e.g., as specified in a tag). If the subset of placement positions exists, the AR application selects one of the subsets, scales the AR object to the size that the placement position can accommodate, and places the AR object at this selected placement position. If not, the AR application redetermines a placement position outside of the intersection region.

In some embodiments, as an example, the AR application may determine a subset of placement positions for the AR object in the identified intersection region that are optimal in distance for all users. If the subset of placement positions exists, the AR application selects one of the subset and places the AR object at this selected placement position. If not, the AR application determines whether the subset can accommodate the minimum and maximum distances for each of the AR objects. If so, the AR application selects one of the subsets and places the AR object at this selected placement position. If not, the AR application redetermines a placement position outside of the intersection region.

In some embodiments, as an example, the AR application may determine a subset of placement positions for the AR object in the identified intersection region that are optimal for the respective orientation of the AR devices. If the subset of placement positions exists, the AR application selects one of the subsets and places the AR object at this selected placement position. If not, the AR application determines whether the subset can accommodate a deviation of orientation for each of the AR objects. If so, the AR application selects one of the subsets and places the AR object at this selected placement position. If not, the AR application redetermines a placement position outside of the intersection region.

In some embodiments, the AR application implements interaction points for the AR objects such that an AR device may interact with the AR object. For example, the AR application may allow the geometry of an AR object to be altered based on receiving a selection of an interaction point for the AR object.

In some embodiments, the AR application determines changes in the respective position and the respective orientation of each AR device of the plurality of AR devices. For example, a number of AR headset users may be viewing a shared AR object (e.g., digital art piece). However, one of the AR headset users leaves the area to use the bathroom. The AR application may apply an update policy that controls the functionality of changed positions and orientations of AR devices. For example, an update policy may be preconfigured with logic to execute one or more actions upon the AR application detecting that an AR device has a changed orientation and/or position. The update policy actions may include to ignore the changed orientation and/or position and take no action. In other embodiments, the update policy actions may include to redetermine a respective field-of-view region over the physical area for each AR device, and reidentify an intersection region in the physical area where all of the respective field-of-view regions intersect.

Figure 5:
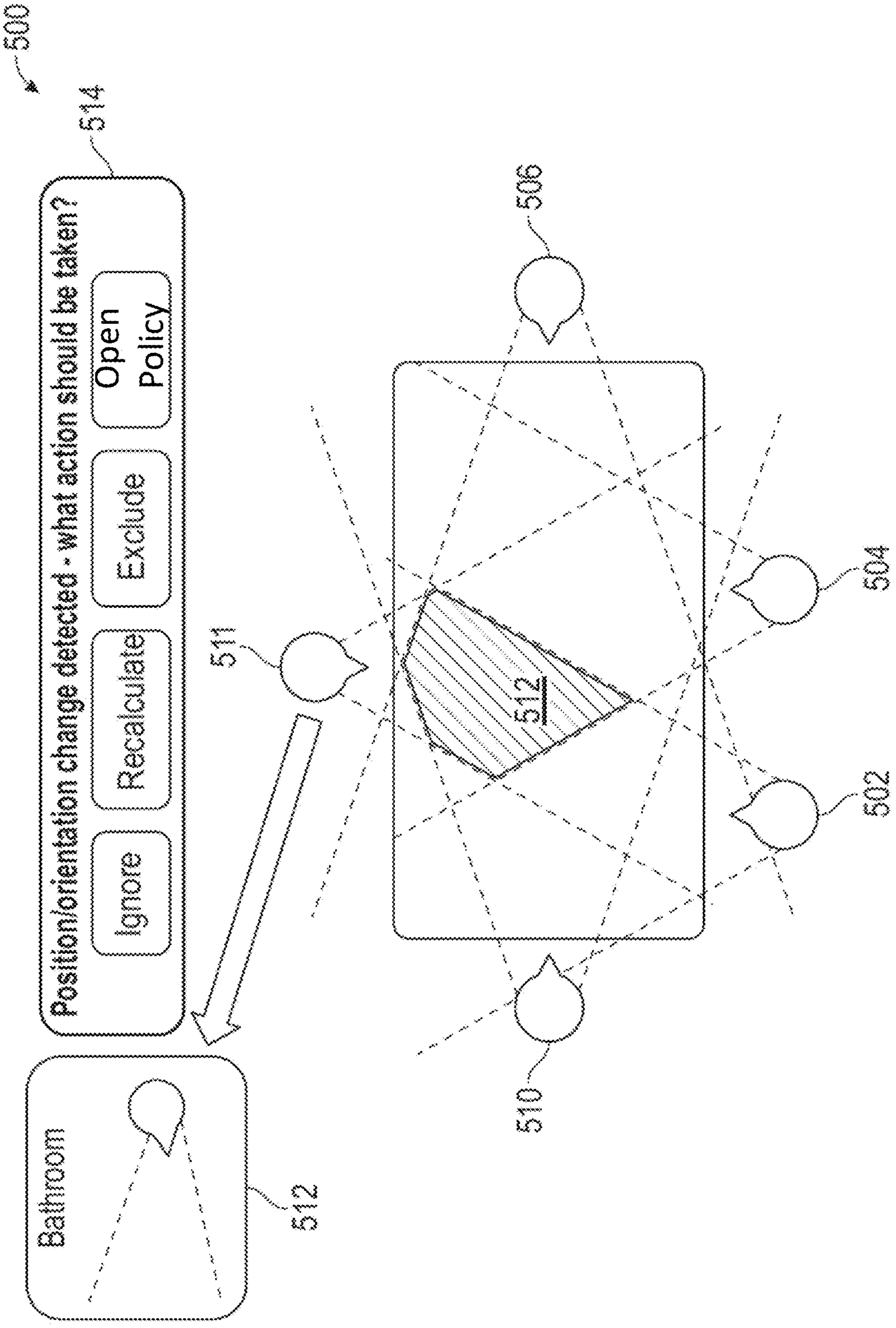
FIG. 5 shows an illustrative scenario of a displayed user interface for an AR device, in accordance with some embodiments of this disclosure.

In yet other embodiments, the update policy may exclude the AR device from future redeterminations/reidentifications. The AR application applies an update policy based on the determined changes by updating the placement position of the AR object, generating for display via the user interface a prompt for action selection, and refraining from updating placement position of the AR object. FIG. 5 shows an illustrative scenario 500 of a displayed user interface 514 for an AR device, in accordance with some embodiments of this disclosure. Following from the example above, an AR device user in a first position 511 who was part of the intersection region moves to use the bathroom at a second position 512. The AR application detects a change in the orientation and position of the AR device that is not part of the intersection region formed by the other AR devices 510, 502, 504, 506, and 508. The host AR device 510, which is sharing the object, is given a user interface prompt 414 with the following options: Ignore, Recalculate, Exclude, or Open policy. The prompt reads "Position/orientation change detected-what action should be taken?" The AR application may receive, from the user interface, a selection defining an exclusionary time period for an AR device of the plurality of AR devices. This exclusionary time period the update policy indicates refraining from updating placement position of the AR object. Continuing with the example, the host AR device recognizes that AR device 512 is using the bathroom and thus should be excluded from the current intersection region as AR device at the bathroom 512 is likely to return to the same position 511 after using the bathroom.

In some embodiments, the update policy, implemented by the AR application, may only recalculate (e.g., redetermine the respective field-of-view regions and reidentify the intersection region) when a change in the respective position and respective orientation for each AR device meets a change threshold. The change threshold may be preconfigured to allow for minor movements or adjustments by one or more of the AR devices such that an entirely new recalculation is not performed by the AR application.

In some embodiments, the AR application may prioritize AR devices that have the largest amount of overlapping respective field regions. Conversely, the AR application may exclude those AR devices that have little to no overlapping respective field regions. In some embodiments, the AR application may exclude an AR device if the AR device has movement that exceeds a threshold (e.g., the AR device is always in motion and is not conducive to a sharing session within other AR devices that are relatively proximate and static).

In some embodiments, the AR application determines changes in the respective position and the respective orientation of each AR device of the plurality of AR devices. The AR application may determine that a desired intersection region is attainable within a small proximity relative to the majority of the AR devices. The AR application may provide an instruction via a user interface to each of the AR devices to alter their position and orientation to the desired new position and orientation to attain the desired intersection region. This may be referred to as "nudging" the AR devices to the desired position and orientation to have a redetermined respective field-of-view region and reidentified intersection region, based on the nudging. For example, if an AR device is hosting an AR sharing session and there is a fountain obstructing the full clarity of the presentation of the AR object for one of the plurality of AR devices, the AR application may display a user interface that provides an arrow, or similar directional indicator, to nudge the AR device into a desired position that makes an ideal intersection region. In some embodiments, the nudging may be a simple translation of a user's AR headset along the z-axis to look higher in the air such that the reidentified intersection region may be a small translation along the z-axis. In another example, the AR application may select an initial preference placement that, while outside the intersection region, optimizes for closer placement to other AR devices while minimizing deviation from the current viewing angles. For example, the users with AR headsets would have to shift their heads only slightly in order to see the content at its chosen location. In many cases it may be possible for users to easily change their position and orientation to some extent, and so placing content near (but just outside) the ideal placement position may entail only minimal movements for AR devices to better see the AR object.

In some embodiments, the AR application may determine a priority of AR devices based on the frequency of movement of the AR devices. The AR application may prioritize a placement position based on the AR device, or devices, with the lowest frequency of movement in order to provide a stable placement position.

In some embodiments, as an example, the AR application may determine whether the respective position or respective orientation of an AR device exceeds a change threshold. In some embodiments, the change threshold is based on a change in position of the AR device. In some embodiments, the change threshold further encompasses measuring whether the change in position exceeds a threshold time. If the AR application determines that the respective position or respective orientation of an AR device exceeds the change threshold, the change is reported to the AR application. If not, the change is ignored. In some embodiments, the AR application determines the status of an AR device as to whether an AR device has joined or left the session. If the AR application does determine the status of the AR device, this status change is reported to the AR application; if not, it is ignored. Upon the reporting of information, the AR application redetermines placement positions within the intersection region. The AR application then determines whether the redetermined placement position is within a redetermination threshold. If so, the AR application confirms the redetermined placement position. If not, the AR application generates for display a user interface to the AR device to request a selection (e.g., (a) ignore and continue to use the redetermined placement position, (b) redetermine the redetermined placement position, or (c) wait until the AR device's positions and orientation naturally change to be within the redetermination threshold).

Figure 6:
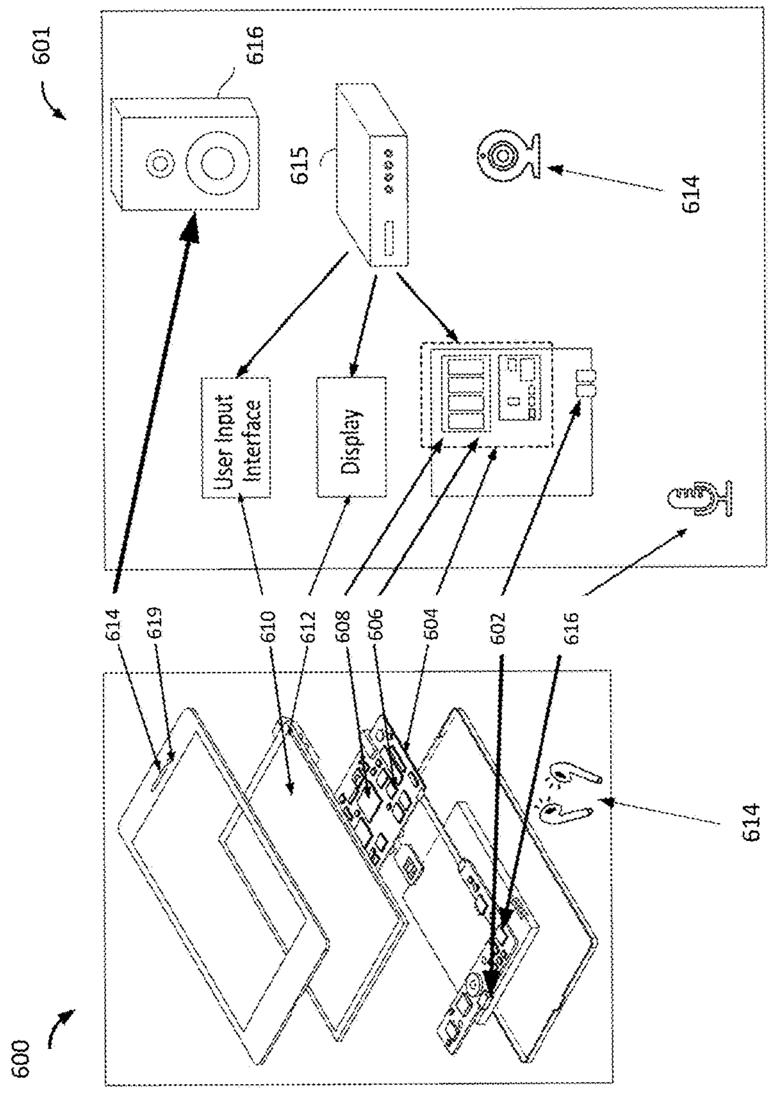
FIG. 6 shows illustrative user equipment devices, in accordance with some embodiments of this disclosure.
Figure 7:
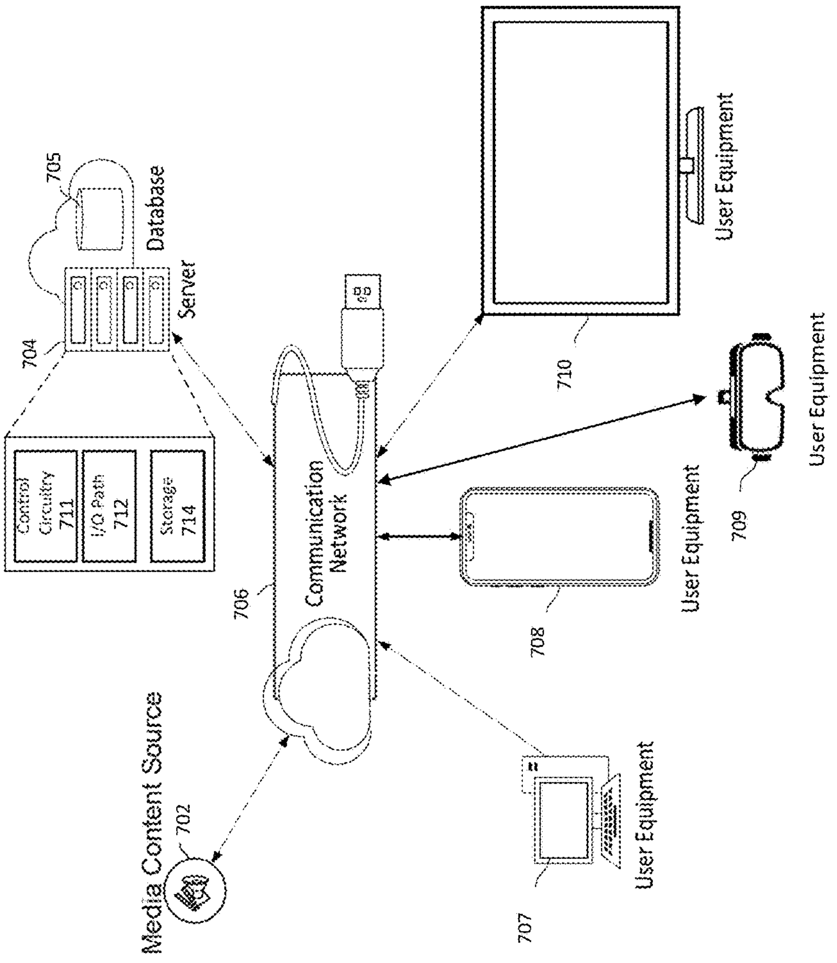
FIG. 7 shows illustrative systems, in accordance with some embodiments of this disclosure.

FIGS. 6-7 describe illustrative devices, systems, servers, and related hardware for a media application for efficient navigation of a plurality of media assets and for playing post-credit content in media assets by overriding play-next logic, in accordance with some embodiments of this disclosure. FIG. 6 shows generalized embodiments of illustrative user devices 600 and 601. For example, user equipment device 600 may be a smartphone device, a tablet, smart glasses, a virtual reality or augmented reality device (e.g., AR goggles, AR headset, AR implemented via smartphone, tablet, or computer), or any other suitable device capable of consuming media assets and capable of transmitting and receiving data over a communication network. In another example, user equipment device 601 may be a user television equipment system or device. User television equipment device 601 may include set-top box 615. Set-top box 615 may be communicatively connected to microphone 616, audio output equipment (e.g., speaker or headphones 614), and display 612. In some embodiments, microphone 616 may receive audio corresponding to a voice of a user, e.g., a voice command. In some embodiments, display 612 may be a television display or a computer display. In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 600 may comprise any suitable number of sensors, as well as a GPS module (e.g., in communication with one or more servers and/or cell towers and/or satellites) to ascertain a location of device 600.

Each one of user equipment device 600 and user equipment device 601 may receive content and data via input/output (I/O) path 602. I/O path 602 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for the Media application stored in memory (e.g., storage 608). Specifically, control circuitry 604 may be instructed by the Media application to perform the functions discussed above and below. In some implementations, processing or actions performed by control circuitry 604 may be based on instructions received from the Media application.

In client/server-based embodiments, control circuitry 604 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the media application may be a client/server application where only the client application resides on device 600, and a server application resides on an external server (e.g., server 704 and/or server 716). For example, the media application may be implemented partially as a client application on control circuitry 604 of device 600 and partially on server 704 as a server application running on control circuitry 711. Server 704 may be a part of a local area network with one or more of devices 600 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 704), referred to as "the cloud." Device 600 may be a cloud client that relies on the cloud computing capabilities from server 704 to determine whether processing should be offloaded and facilitate such offloading. When executed by control circuitry 604 or 711, the media application may instruct control circuitry 604 or 711 circuitry to perform processing tasks for the client device and facilitate a media consumption session integrated with social network services. The client application may instruct control circuitry 604 to determine whether processing should be offloaded.

Control circuitry 604 may include communications circuitry suitable for communicating with a server, social network service, a table or database server, or other networks or servers The instructions for carrying out the above-mentioned functionality may be stored on a server (which is described in more detail in connection with FIG. 6).

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media application data described above. Nonvolatile memory may also be used (e.g., to launch a boot-up routine and other instructions). Cloud-based storage may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The media application may be implemented using any suitable architecture. For example, it may be a stand-alone application wholly-implemented on each one of user equipment device 600 and user equipment device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide media consumption and social network interaction functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a media application and social network profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the media application is a client/server-based application. Data for use by a thick or thin client implemented on each one of user equipment device 600 and user equipment device 601 may be retrieved on-demand by issuing requests to a server remote to each one of user equipment device 600 and user equipment device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display may then be transmitted to device 600 for presentation to the user.

In some embodiments, the media application may be downloaded and interpreted or otherwise run by an interpreter or virtual machine (run by control circuitry 604). In some embodiments, the media application may be encoded in the ETV Binary Interchange Format (EBIF), received by control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2 or other digital media encoding schemes), the media application may be, for example, encoded and transmitted in an MPEG-2 object carousel with the MPEG audio and video packets of a program.

FIG. 7 is a diagram of an illustrative system 700, in accordance with some embodiments of this disclosure. User equipment devices 707, 708, 709, 710 (e.g., user device; devices or any other suitable devices, or any combination thereof) may be coupled to communication network 706. Communication network 706 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 may comprise media content source 702, one or more servers 704, and one or more social network services. In some embodiments, the media application may be executed at one or more of control circuitry 711 of server 704 (and/or control circuitry of user equipment devices 707, 708, 709, 710.

In some embodiments, server 704 may include control circuitry 711 and storage 714 (e.g., RAM, ROM, Hard Disk, Removable Disk, etc.). Instructions for the media application may be stored in storage 714. In some embodiments, the media application, via control circuitry, may execute functions outlined in FIGS. 1-5. Storage 714 may store one or more databases. Server 704 may also include an input/output path 712. I/O path 712 may provide media consumption data, social networking data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths. I/O path 712 may comprise I/O circuitry.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711.

Figure 8:
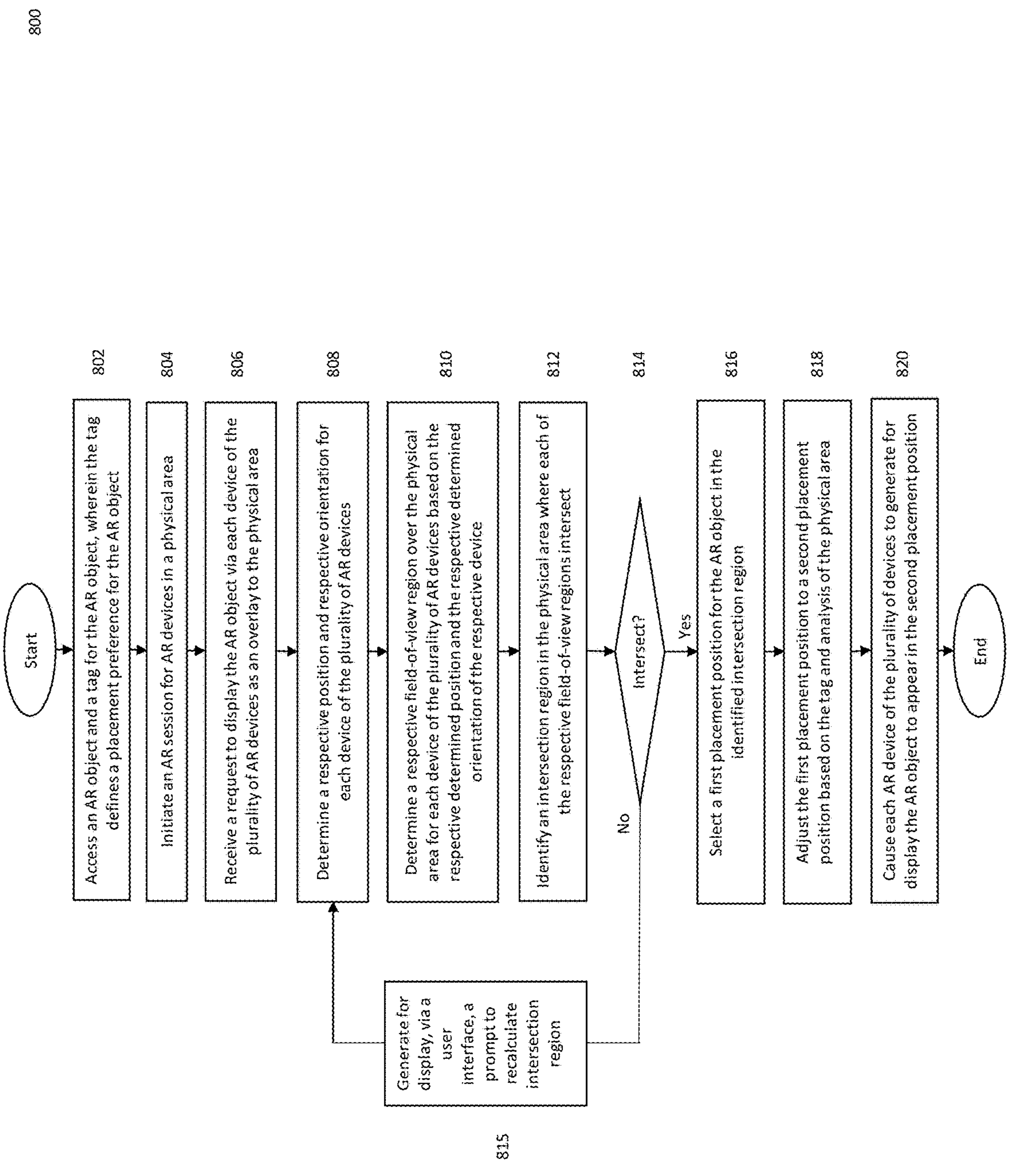
FIG. 8 is a flowchart of a detailed illustrative process for adjusting the placement position of an AR object, in accordance with some embodiments of this disclosure.

FIG. 8 is a flowchart of a detailed illustrative process for adjusting the placement position of an AR object, in accordance with some embodiments of this disclosure. In various embodiments, the individual steps of process 800 may be implemented by one or more components of the devices and systems of FIGS. 1-7. Although the present disclosure may describe certain steps of process 800 (and of other processes described herein) as being implemented by certain components of the devices and systems of FIGS. 1-7, this is for purposes of illustration only, and it should be understood that other components of the devices and systems of FIGS. 1-7 may implement those steps instead.

At 802, the AR application, via the control circuitry 711, stores an AR object and a tag for the AR object. In some embodiments, the AR application may store the AR object and/or tag in user equipment 600 (via I/O path 712), database 705, storage 714, or server 704.

At 804, the AR application, via the control circuitry 711, initiates an AR session for AR devices in a physical area. In some embodiments, the initiation is implemented via the I/O Path 712. The AR devices may include user equipment 600 (via I/O path 712), 707, 708, 709, and/or 710.

At 806, the AR application, via the control circuitry 711, receives a request to display the AR object via each device of the plurality of AR devices as an overlay to the physical area. In some embodiments, the request is received via I/O path 712 from user equipment 600 (via I/O path 712), 707, 708, 709, and/or 710.

At 808, the AR application, via the control circuitry 711, determines a respective position and respective orientation for each device of the plurality of AR devices. At 810, the AR application, via the control circuitry 711, determines a respective field-of-view region over the physical area for each device of the plurality of AR devices based on the respective determined position and the respective determined orientation of the respective device. The AR application receives position and orientation information via I/O path 712 from user equipment 600 (via I/O path 712), 707, 708, 709, and/or 710.

At 812, the AR application, via the control circuitry 711, identifies an intersection region in the physical area where all of the field-of-view regions intersect. If, at 814, the AR application, via control circuitry 711, cannot identify an intersection region in the physical area where all of the field-of-view regions intersect, the process continues to 815. At 815, the AR application, via the control circuitry 711, generates for display, via a user interface, a prompt to recalculate an intersection region. The process then reverts to 808. If, at 814, the AR application, via control circuitry 711, identifies an intersection region in the physical area where all of the field-of-view regions intersect, the process proceeds to 816. At 816, the AR application, via control circuitry 711, selects a first placement position for the AR object in the identified intersection region.

At 818, the AR application, via the control circuitry 711, adjusts the first placement position to a second placement position based on the tag and analysis of the physical area. The AR application accesses the tag via user equipment 600 (via I/O path 712), database 705, storage 714, or server 704. The analysis of the physical area is received via I/O path 712 from user equipment 600 (via I/O path 712), 707, 708, 709, and/or 710.

At 820, the AR application, via the control circuitry 711, causes each AR device of the plurality of AR devices to generate for display the AR object to appear in the second placement position. The AR application generates for display via I/O path 712 from user equipment 600 (via I/O path 712), 707, 708, 709, and/or 710.

Figure 9:
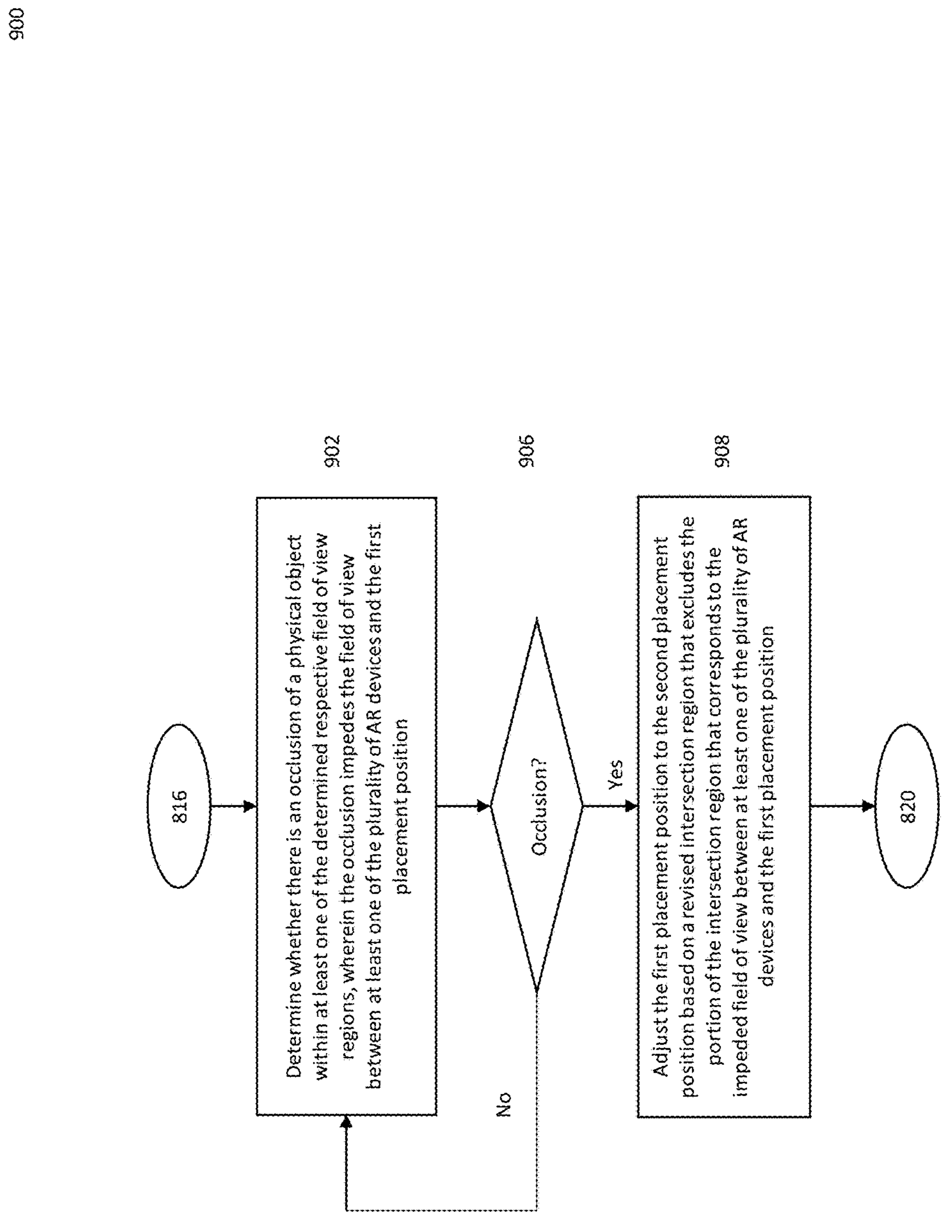
FIG. 9 is a flowchart of a detailed illustrative process for adjusting the placement position of an AR object that excludes an impeded field of view, in accordance with some embodiments of this disclosure.

FIG. 9 is a flowchart of a detailed illustrative process 900 for adjusting the placement position of an AR object that excludes an impeded field of view, in accordance with some embodiments of this disclosure. At 902, the AR application, via the control circuitry 711, determines whether there is an occlusion of a physical object within at least one of the determined respective field-of-view regions. The AR application receives data from the AR devices to determine occlusion via I/O path 712 from user equipment 600 (via I/O path 712), 707, 708, 709, and/or 710. If, at 906, the AR application, via control circuitry 711, determines there is not an occlusion of a physical object within at least one of the determined respective field-of-view regions, the process reverts to 902. If, at 906, the AR application, via the control circuitry 711, determines there is an occlusion of a physical object within at least one of the determined respective field-of-view regions, the process then proceeds to 908. At 908, the AR application, via the control circuitry 711, adjusts the first placement position to the second placement position based on a revised intersection region that excludes the portion of the intersection region that corresponds to the impeded field of view between at least one of the plurality of AR devices and the first placement position.

Figure 10:
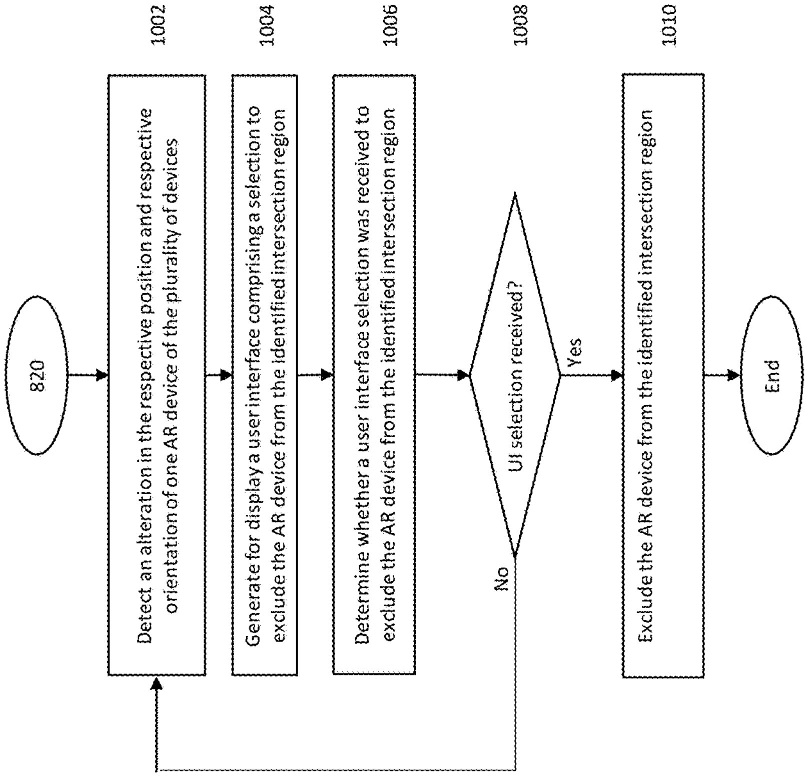
FIG. 10 is a flowchart of a detailed illustrative process for excluding an AR device from an identified intersection region based on a user interface selection, in accordance with some embodiments of this disclosure.

FIG. 10 is a flowchart of a detailed illustrative process 1000 for excluding an AR device from an identified intersection region based on a user interface selection, in accordance with some embodiments of this disclosure. At 1002, the AR application, via the control circuitry 711, detects an alteration in the respective position and respective orientation of one AR device of the plurality of devices. The detection of alteration is via I/O path 712 from user equipment 600 (via I/O path 712), 707, 708, 709, and/or 710.

At 1004, the AR application, via the control circuitry 711, generates for display a user interface comprising a selection to exclude the AR device from the identified intersection region. The generation for display of the user interface is via I/O path 712 from user equipment 600 (via I/O path 712), 707, 708, 709, and/or 710.

At 1006, the AR application, via the control circuitry 711, determines whether a user interface selection was received to exclude the AR device from the identified intersection region. The receiving of user interface selection is via I/O path 712 from user equipment 600 (via I/O path 712), 707, 708, 709, and/or 710. If, at 1008, the AR application, via control circuitry 711, a user interface selection was not received to exclude the AR device from the identified intersection region, the process reverts to 1002. If, at 1008, the AR application, via control circuitry 711, a user interface selection was received to exclude the AR device from the identified intersection region, the process proceeds to 1010. At 1010, the AR application, via the control circuitry 711, excludes the AR device from the identified intersection region. The exclusion is via I/O path 712 from user equipment 600 (via I/O path 712), 707, 708, 709, and/or 710.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing an AR object and a tag for the AR object, wherein the tag defines a placement preference for the AR object;

initiating an AR session for a plurality of AR devices in a physical area;

receiving a request to display the AR object via each AR device of the plurality of AR devices as an overlay to the physical area;

determining a respective position and respective orientation for each AR device of the plurality of AR devices;

determining a respective field-of-view region over the physical area for each AR device of the plurality of AR devices based on the respective determined position and the respective determined orientation of the respective AR device;

identifying an intersection region in the physical area where each of the respective field-of-view regions intersect;

selecting a first placement position for the AR object in the identified intersection region;

adjusting the first placement position to a second placement position based on the tag and analysis of the physical area, wherein the analysis of the physical area comprises:

detecting an occlusion of the first placement position for the AR object by a physical object within a determined field-of-view region of an AR device of the plurality of AR devices; and adjusting the first placement position for the AR object outside the detected occlusion;

causing each AR device of the plurality of AR devices to generate for display the AR object to appear in the second placement position.

2. The method of claim 1, wherein the adjusting comprises:

adjusting the first placement position to the second placement position based on a revised intersection region that excludes a portion of the intersection region that corresponds to a region affected by the occlusion.

3. The method of claim 1, wherein the adjusting comprises:

adjusting the first placement position to the second placement position that is on a periphery of a region affected by the occlusion.

4. The method of claim 1, wherein the selecting the first placement position for the AR object in the identified intersection region comprises:

selecting a position within the identified intersecting region that is equidistant from each AR device of the plurality of AR devices.

5. The method of claim 1, wherein the placement preference comprises a defined orientation for the AR object.

6. The method of claim 1, wherein the placement preference comprises a defined minimum size threshold for appearance of the AR object for each AR device of the plurality of AR devices.

7. The method of claim 1, further comprising:

determining changes in the respective position and the respective orientation of each AR device of the plurality of AR devices; and applying an update policy based on the determined changes, wherein the update policy comprises at least one of:

updating placement position of the AR object;

generating for display, via a user interface, a prompt for action selection; and refraining from updating placement position of the AR object.

8. The method of claim 7, further comprising:

receiving, from the user interface, a selection defining an exclusionary time period for an AR device of the plurality of AR devices, wherein during the exclusionary time period the update policy indicates refraining from updating placement position of the AR object.

9. A method comprising:

accessing an AR object and a first tag for the AR object, wherein the first tag defines a first placement preference for the AR object;

initiating an AR session for a plurality of AR devices in a physical area;

receiving a request to display the AR object via each AR device of the plurality of AR devices as an overlay to the physical area;

determining a respective position and respective orientation for each AR device of the plurality of AR devices;

determining a respective field-of-view region over the physical area for each AR device of the plurality of AR devices based on the respective determined position and the respective determined orientation of the respective AR device;

identifying an intersection region in the physical area where each of the respective field-of-view regions intersect;

selecting a first placement position for the AR object in the identified intersection region;

adjusting the first placement position to a second placement position based on the tag and analysis of the physical area;

causing each AR device of the plurality of AR devices to generate for display the AR object to appear in the second placement position;

accessing a second tag for the AR object, wherein the second tag defines a second placement preference for the AR object;

determining a priority of placement preference between the first placement preference and the second placement preference; and adjusting the second placement position based on the determined priority of placement preference.

10. A system comprising:

control circuitry configured to:

access an AR object and a tag for the AR object, wherein the tag defines a placement preference for the AR object;

initiate an AR session for a plurality of AR devices in a physical area;

receive a request to display the AR object via each AR device of the plurality of AR devices as an overlay to the physical area;

determine a respective position and respective orientation for each AR device of the plurality of AR devices;

determine a respective field-of-view region over the physical area for each AR device of the plurality of AR devices based on the respective determined position and the respective determined orientation of the respective AR device;

identify an intersection region in the physical area where each of the respective field-of-view regions intersect;

select a first placement position for the AR object in the identified intersection region;

adjust the first placement position to a second placement position based on the tag and analysis of the physical area, wherein the analysis of the physical area comprises:

detecting an occlusion of the first placement position for the AR object by a physical object within a determined field-of-view region of an AR device of the plurality of AR devices; and adjusting the first placement position for the AR object outside the detected occlusion;

cause each AR device of the plurality of AR devices to generate for display the AR object to appear in the second placement position.

11. The system of claim 10, wherein the control circuitry is configured, when adjusting, to:

adjust the first placement position to the second placement position based on a revised intersection region that excludes a portion of the intersection region that corresponds to a region affected by the occlusion.

12. The system of claim 10, wherein the control circuitry is configured, when adjusting, to:

adjust the first placement position to the second placement position that is on a periphery of a region affected by the occlusion.

13. The system of claim 10, wherein the tag for the AR object is a first tag that defines a first placement preference, and wherein the control circuitry is further configured to:

access a second tag for the AR object, wherein the second tag defines a second placement preference for the AR object;

determine a priority of placement preference between the first placement preference and the second placement preference; and adjust the second placement position based on the determined priority of placement preference.

14. The system of claim 10, wherein the control circuitry is configured, when selecting the first placement position for the AR object in the identified intersection region, to:

select a position within the identified intersecting region that is equidistant from each AR device of the plurality of AR devices.

15. The system of claim 10, wherein the placement preference comprises a defined orientation for the AR object.

16. The system of claim 10, wherein the placement preference comprises a defined minimum size threshold for appearance of the AR object for each AR device of the plurality of AR devices.

17. The system of claim 10, wherein the control circuitry is further configured to:

determine changes in the respective position and the respective orientation of each AR device of the plurality of AR devices; and apply an update policy based on the determined changes, wherein the update policy comprises at least one of:

update placement position of the AR object;

generate for display, via a user interface, a prompt for action selection; and refrain from updating placement position of the AR object.

18. The system of claim 17, wherein the control circuitry is further configured to:

receive, from the user interface, a selection defining an exclusionary time period for an AR device of the plurality of AR devices, wherein during the exclusionary time period the update policy indicates refraining from updating placement position of the AR object.

* * * * *